United States Patent [19]
Morris

[11] Patent Number: 5,858,177
[45] Date of Patent: Jan. 12, 1999

[54] PROCESS AND APPARATUS FOR VAPOR COMPRESSION DISTILLATION USING PLATE AND FRAME HEAT EXCHANGER

[76] Inventor: Bobby D. Morris, 103 Lake Forest Dr., Greer, S.C. 29651

[21] Appl. No.: 693,421

[22] Filed: Aug. 7, 1996

[51] Int. Cl.[6] .................................................. B01D 3/00
[52] U.S. Cl. ................................................... 203/26
[58] Field of Search ........................................ 203/26

[56] References Cited

U.S. PATENT DOCUMENTS

5,597,453  1/1997  Sears ........................................ 203/24

*Primary Examiner*—Edward J. Cain
*Attorney, Agent, or Firm*—Hardaway Law Firm, P.A.

[57] ABSTRACT

An improved process and apparatus for vapor compression distillation is provided comprising a heat exchanger, a vapor compressor, and a liquid-vapor separator. The heat exchanger is preferably of the plate and frame type, with the plate faces being spaced apart to allow for the microscopic movement of the plates during the distillation process. This movement aids in the breaking off of hard scale which has accumulated on the plates. The process involves passing pressurized vapor and liquid into the heat exchanger, the pressurized vapor condensing to form a distillate, the liquid being heated to form a heated liquid and a non-pressurized vapor, the heated liquid and non-pressurized vapor being passed into a liquid-vapor separator where they are separated, the heated liquid being passed back into the heat exchanger and the non-pressurized vapor being passed into a vapor compressor for passage back into the heat exchanger.

22 Claims, 8 Drawing Sheets

PROCESS AND APPARATUS FOR VAPOR COMPRESSION DISTILLATION USING PLATE AND FRAME HEAT EXCHANGER

BACKGROUND OF THE INVENTION

This invention relates generally to the art of energy recycling processes and apparatuses, and more particularly to an improved process and apparatus for vapor compression distillation.

A variety of processes and apparatuses utilizing vapor compression for distillation exist in the prior art. Such prior art processes and apparatuses frequently employ an evaporating chamber for boiling a liquid passing therethrough. The resulting vapor is usually compressed to enable its use as a primary source of heat in the evaporating chamber. The compressed vapor is condensed as its heat is transferred to the liquid by means of an indirect contact heat transfer element such as a tube bundle.

Tube bundles are used in a shell and tube heat exchanger. In a shell and tube heat exchanger, either a liquid or a vapor is passed through the inside of the tubes, the other being passed around the outside of the tubes. The liquid and vapor usually flow in countercurrent directions to maximize the amount of heat that can be exchanged.

Figure 7:
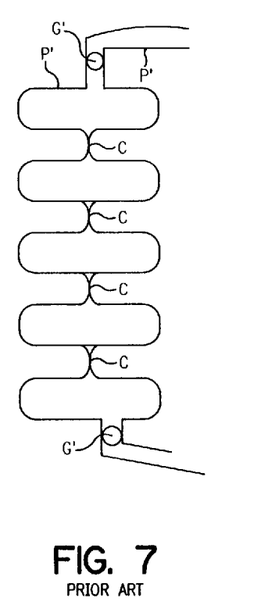
FIG. 7 is an elevation view of a prior art arrangment of heat exhanger plates indicating how adjacent plates come into at least partial contact with each other.

Plate and frame heat exchangers may also be used for transferring heat from a vapor to a liquid. In a plate and frame heat exchanger, liquid and vapor are passed along opposite sides of a plurality of generally parallel plates. The plates serve as the heat transfer element and are compressed together to prevent the intermingling of fluids. Adjacent plates P' are also in at least partial contact with each other at points C (FIG. 7).

A variety of processes and apparatuses teach the compression of vapors from evaporated liquids, most of which employ a shell and tube design. U.S. Pat. Nos. 3,532,161; 4,769,113; 4,919,592; 4,869,067; and 3,901,768 teach such systems.

Despite the prior art devices, there is room for improvement within the art of vapor compression distillation.

SUMMARY OF THE INVENTION

It is therefore an object of this invention to provide an improved process and apparatus for vapor compression distillation.

It is another object of this invention to provide an improved process and apparatus for vapor compression distillation that is highly efficient, economical, and safe to operate.

It is another object of this invention to provide an improved process and apparatus for vapor compression distillation that can be used for a variety of processes, including purification of a waste stream and resource recovery.

It is yet another object of this invention to provide an improved process and apparatus for vapor compression distillation that keeps scale buildup to a minimum.

These and other objects of the invention are achieved by a vapor compression distillation apparatus comprising a heat exchanger; a vapor compressor being in one-way fluid communication with the heat exchanger; a liquid-vapor separator being in two-way fluid communication with the heat exchanger and being in one-way fluid communication with the vapor compressor; an inlet passage for passing feed into the separator; and a first exit passage for passing distillate out of the heat exchanger.

The process of vapor compression distillation according to the present invention comprises the steps of providing a heat exchanger, a liquid-vapor separator, and a vapor compressor; passing a pressurized vapor into the heat exchanger; passing a liquid into the heat exchanger; allowing the pressurized vapor to at least partially condense and form a distillate; passing the distillate out of the heat exchanger; heating the liquid with heat given off by the pressurized vapor; forming a heated liquid and a non-pressurized vapor from the liquid; passing the heated liquid and the non-pressurized vapor into the separator; separating the heated liquid and the non-pressurized vapor in the separator; passing the heated liquid into the heat exchanger; passing the non-pressurized vapor into the vapor compressor; pressurizing the non-pressurized vapor to form more pressurized vapor; and passing the more pressurized vapor into the heat exchanger.

DETAILED DESCRIPTION

According to the present invention, it has been found that an improved process and apparatus for vapor compression distillation that meets and achieves the various objects of this invention as described above can be utilized. These and other features of the invention will become apparent from the description that follows with particular reference to the figures of drawing.

Plate and frame type heat exchangers (PHEs) possess many advantages over shell and tube type heat exchangers (SHEs). First, heat transfer in a PHE is much better than in a SHE. In the PHE according to the present invention, the heat transfer efficiency has been found to be from 3 to 5 times greater than that of existing SHEs. Performance analysis has indicated that the heat transfer coefficient, or "U" value, for the PHE according to the present invention under 4 psig pressure and with a hot and cold fluid temperature difference of 12° F. is 487 BTU/(hr*°F.*ft$^2$), whereas the "U" value for an existing SHE under the same conditions is 92 BTU/(hr*°F.*ft$^2$). Thus, the PHE according to the present invention will perform at about 5.3 times the heat transfer rate of existing SHEs. During normal operation, the amount of liquid inside a plate and frame heat exchanger according to the present invention is only about 10 percent of the liquid that would be inside of a comparable shell and tube heat exchanger. This smaller volume of liquid allows for quicker startup. Also, because this smaller volume of liquid possesses a smaller amount of energy, the present invention affords safe operating conditions.

A corrugated design of the heat transfer plates is one of the main reasons for the enhanced heat transfer in PHEs. This design creates turbulence when a fluid passes around the plate, and turbulence is known to have a direct relationship with heat transfer rate.

Second, surface fouling, or scaling, in PHEs is lower than in SHEs. This is also due to high turbulence. In SHEs, it is often necessary to place "turbulators" within the heat exchange tubes to increase turbulence within the tubes. However, PHEs do not require such turbulators due to the configuration of the innerspaces between the plates.

There are drawbacks to using conventional PHEs, however, particularly in distillation processes. It is commonly desired to purify a water stream in such processes. Since all natural waters contain at least some impurities which precipitate out of solution as scale, scale will deposit on metal surfaces. While scale formation is greatly reduced in PHEs, as discussed above, it is still a problem because scale has a very low thermal conductivity, and any deposited scale significantly reduces the heat transfer efficiency of the unit.

Scale buildup occurs in traditional PHEs because of the conventional arrangement of the plates. In traditional PHEs, the plates are compressed together causing adjacent plates to be in contact. Scale tends to deposit on the points where the plates contact. While the turbulent flow through the corrugations tends to dislodge some of this scale, it cannot serve as a panacea, and scale remains.

The present invention, however, arranges the plates so that they are slightly spaced apart. The spacing eliminates the numerous contact point where scale has been known to accumulate, and allows the plates to move microscopically when thermal and pressure forces are applied to the plates. Thermal dilations of the plates occur due to the temperature differences between the hot and cold fluids, and cause the plates to expand and contract. Pressure, or mechanical, dilations of the plates result from pressure differences between the hot and cold fluids, and from surges of a vapor compressor. These forces also cause the plates to microscopically move. While these dilations are very small, they tend to cause hard scale that has formed to crack and fall away from plate surfaces. The method of spacing the plates apart will be described in detail later.

Other design characteristics of the present invention which assist in scale control: the normal operating temperature of the heat exchanger (212–216° F.) is below the critical operating temperature for scale formation (260–280° F.); the temperature difference between the hot and cold fluids within the heat exchanger is only a few degrees, whereas conventional boilers operate with temperature differences on the order of 500° F.; and scale crystals are purposely pumped into the heat exchanger which serve to dislodge scale from exchanger surfaces much as a dentist uses salt crystals to clean teeth.

Figure 1:
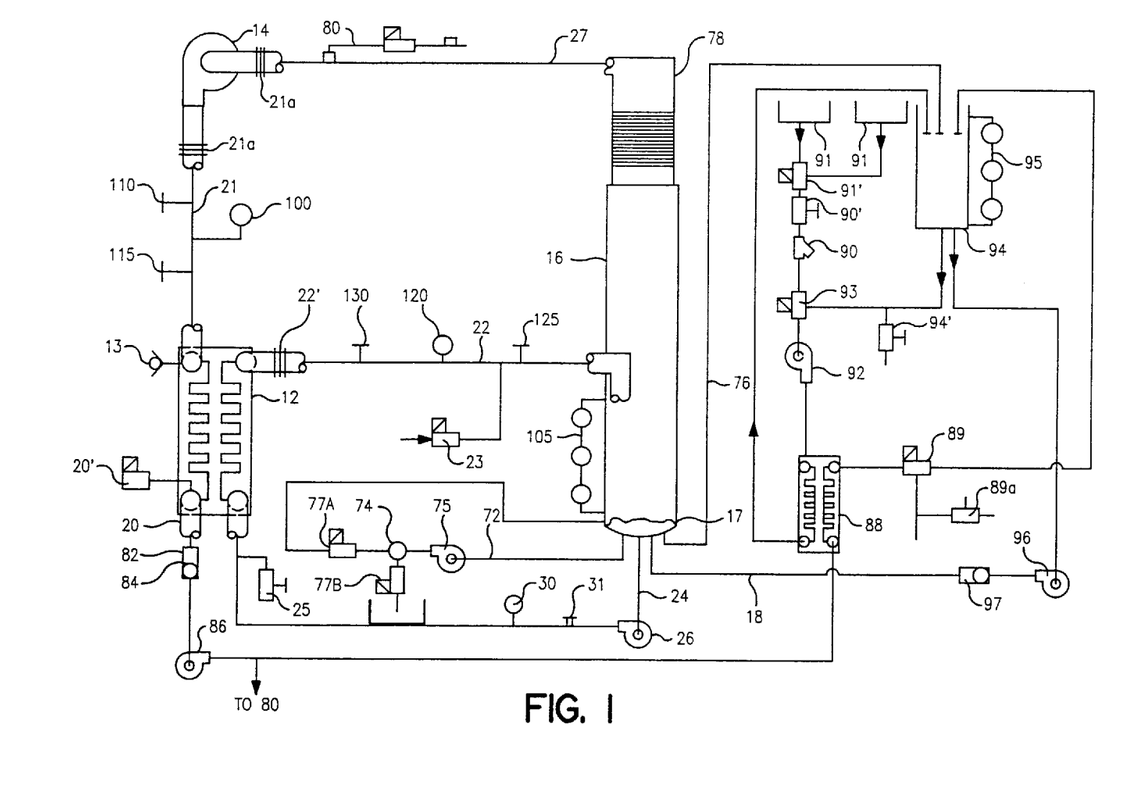
FIG. 1 is a schematic representation of a vapor compression distillation apparatus according to the present invention.

Referring to the drawings, FIG. 1 illustrates a schematic representation of a preferred embodiment of the vapor compression distillation apparatus according to the present invention. As illustrated, the apparatus comprises heat exchanger 12, vapor compressor 14, and separator 16. Separator 16 has a bottom section 17 that is preferably shaped as an inverted dome and may have high-operating-low level indicator 105 for indicating the level of liquid within separator 16. Inlet passage 18 allows a feed liquid to enter separator 16, and first exit passage 20 allows distillate to leave heat exchanger 12. A vent valve 20' can be associated with first exit passage 20. Heat exchanger 12 is in one-way fluid communication with vapor compressor 14; specifically, a pressurized vapor flows from vapor compressor 14 to heat exchanger 12 via passage 21 and optional flexible coupling 21a. Condenser temperature sensor 100, condenser pressure sensor 110, and pressure gage 115 may also be provided. Heat exchanger 12 may also have a pressure release valve 13. Heat exchanger 12 is in two-way fluid communication with separator 16; specifically, non-pressurized vapor and heated liquid flow from heat exchanger 12 to separator 16 via passage 22 and optional flexible coupling 22', and heated liquid is returned to heat exchanger 12 via passage 24 which can have drain valve 25, pressure gage 30, and flow sensor 31. Pressure gauge 125, pressure sensor 120, and temperature sensor 130 can optionally be connected to passage 22 to monitor operating conditions. Circulating pump 26 can be used to aid in the passage of heated liquid back to heat exchanger 12. Steam injection line 23 is used for injecting steam into separator 16 during startup, before steady state is reached. Non-pressurized vapor refers to vapor that has not been passed through vapor compressor 14.

Figure 2:
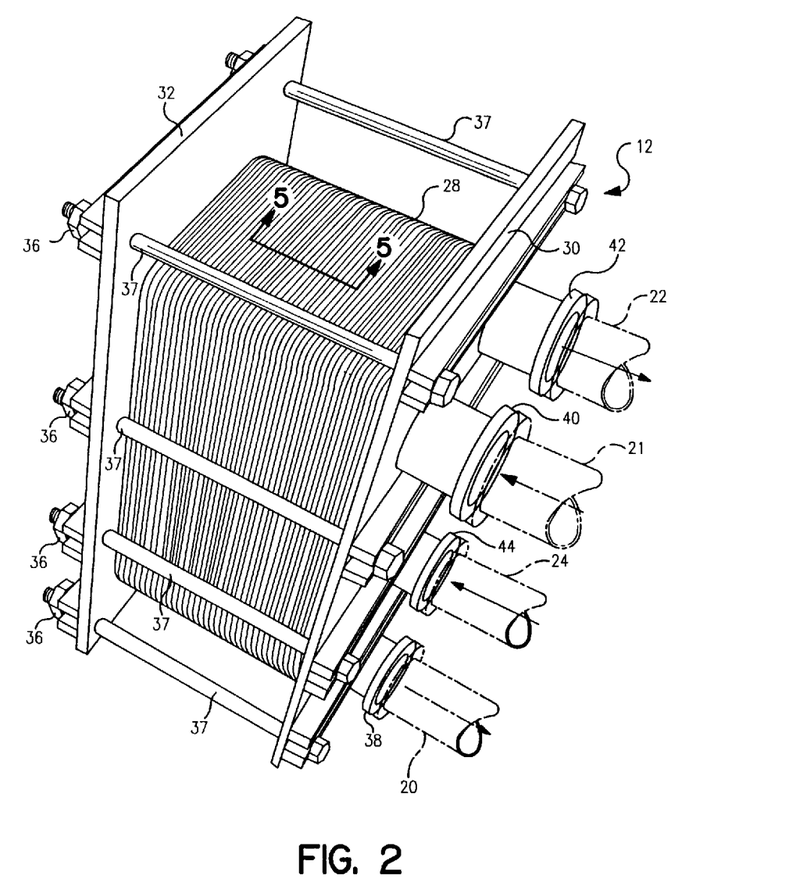
FIG. 2 is a perspective view of a plate and frame heat exchanger according to the present invention.

A preferred embodiment of heat exchanger 12 according to the present invention is illustrated in FIG. 2. Heat exchanger 12 comprises a plurality of generally vertical plates 28; end caps 30 and 32; rods 37; compression bolts 36; pressurized vapor inlet 40; heated liquid and non-pressurized vapor outlet 42; liquid inlet 44; and distillate outlet 38. A plurality of plates is often referred to as a plate pack.

End cap 30 is fixed, but end cap 32 is usually horizontally movable, allowing for the removing or adding of plates 28 as required. Pressurized vapor flows from vapor compressor 14, through passage 21, and into heat exchanger 12. A pressurized pressure relief valve 13 may also be provided. Liquid flows from separator 16, through passage 24, and into heat exchanger 12 through liquid inlet 44. In heat exchanger 12, the pressurized vapor gives up its sensible and latent heats, causing some of the liquid to boil. The pressurized vapor condenses and forms a distillate, which is passed out of distillate outlet 38 and into first exit passage 20. The distillate is relatively pure in one component, and is usually the desired product. The heated liquid and non-pressurized vapor are passed out of heated liquid and non-pressurized vapor outlet 42, through passage 22, and into separator 16.

Liquid enters heat exchanger 12 at a temperature of about 213° F. Pressurized vapor enters heat exchanger 12 at about 290 ° F. This provides a temperature difference of about 77° F. between the hot fluid and the cold fluid in the upper portion of heat exchanger 12. When the pressurized vapor reaches the lower portions of heat exchanger 12, it has cooled to approximately 230° F., thus affording a temperature difference of about 17° F. in this area. Since heat transfer is directly related to the temperature difference between a hot and a cold fluid, most of the boiling of the liquid occurs in the upper portion of heat exchanger 12, where the temperature difference is the largest. The normal operating pressure in heat exchanger 12 is approximately four to five psig.

When a liquid is boiled in a heat exchanger, the resulting vapor tends to expand and shoot out of the exchanger. This "shotgun" action of the vapor also forces liquid above the vapor out of the exchanger before sufficient heat has been transferred to the liquid. Since, according to the present invention, evaporation is more concentrated in the upper portion of the heat exchanger, there will be less liquid above the expanding vapor. Consequently, less liquid will be shot out of the exchanger with the vapor, and heat transfer will be more efficient.

According to the present invention, it has been found that the amount of liquid vaporized is not as important as maintaining the proper flow rates in the system in order to maximize efficiency.

Figure 3A:
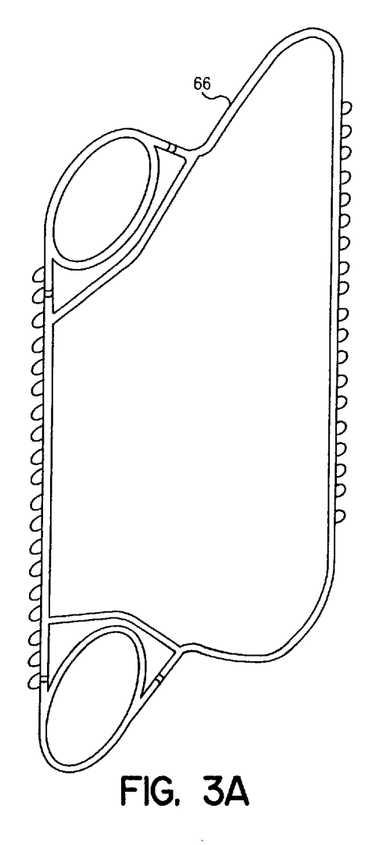
FIGS. 3A and 3B illustrate perspective views of a plate and gasket, respectively, for use in a heat exchanger according to the present invention.

A preferred embodiment of heat exchanger plate 28 according to the present invention is depicted in FIG. 3A. FIG. 3A shows a first side (front/back) of a corrugated plate 28 having a gasket retaining rim 29 about its perimeter such that plate 28 has a recessed and a non-recessed side (front/back) . Corrugated plate 28 comprises a middle section 46 having a plurality of grooves 48 therein. Grooves 48 are shown to be arranged in a chevron configuration. Plate 28 also comprises a top section 50 having a plurality of grooves 52 therein, and a bottom section 54 having a plurality of grooves 56 therein. Top and bottom sections 50 and 54 are much smaller than middle section 46. Grooves 52 and 56 are shown to extend generally diagonally in opposite directions. Grooves 48, 52, and 56 force fluid flowing up or down along a surface of plate 28 into specific areas, and serve to increase turbulence by continuously altering the flow path of the fluid. As discussed earlier, increasing turbulence increases the heat transfer coefficient, and thus makes for a highly efficient and economical process. Typically, the second side (back/front) of plate 28 is the mirror image of the first side, i.e., wherever there is a groove in the first side there is a bulge in the second side (but see FIG. 5).

Figure 5:
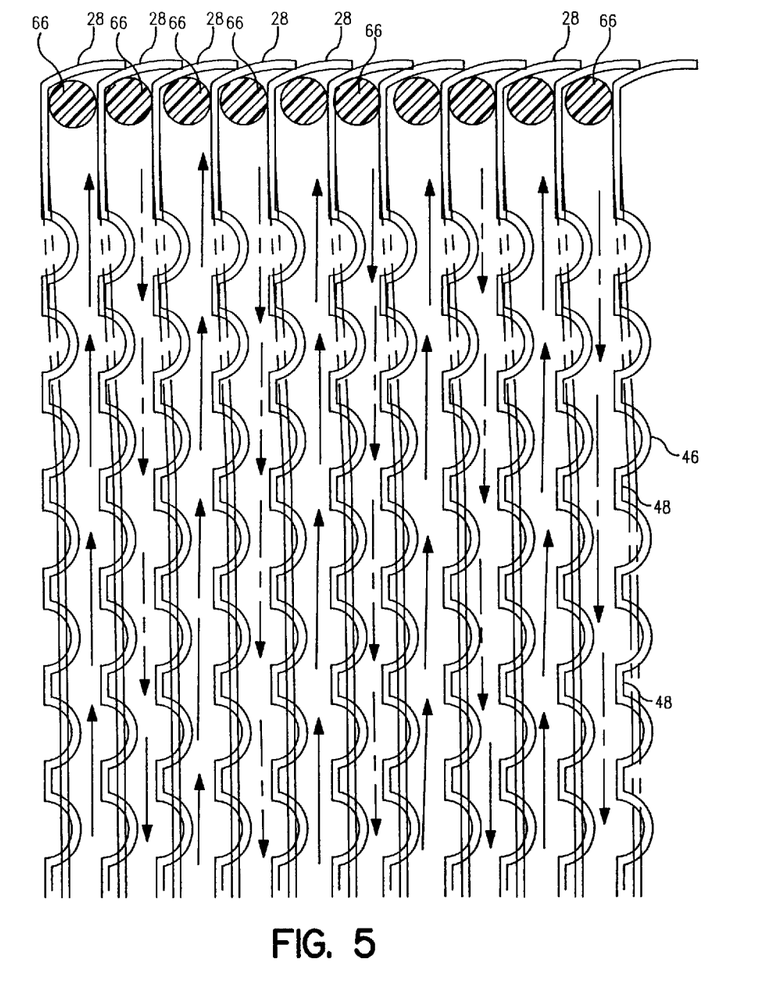
FIG. 5 is an example of an elevation view along line 5—5 of FIG. 2.
Figure 8:
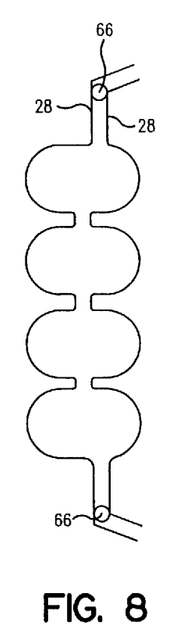
FIG. 8 is an elevation view of an arrangement of heat exhanger plates according to the invention indicating how adjacent plates do not come into at least partial contact with each other.

Top section 50 defines holes 58 and 60 therein, and bottom section 54 defines holes 62 and 64 therein. Hole 64 is in fluid communication with inlet 44 and hole 58 is in fluid communication with inlet 40. As shown in FIG. 3A, groove 68 is provided along the perimeter of the first side (front/back) of plate 28, i.e., within rim 29. Gasket 66 is fitted into groove 68 of each plate 28. According to the present invention, when the plate pack is compressed and secured in this compressed position by compression bolts 36, gaskets 66 will cause the plates' 28 surfaces to be spaced apart (FIG. 8). Accordingly, the plate faces do not come into contact at all, as they do in prior art PHEs, as described above (FIG. 7). Rims 29 overlap to retain gaskets 66 and seal the area between the plates and prevent fluid leakage to the outside. As discussed earlier, this spacing apart of the plates allows them to microscopically move when thermal and mechanical forces are applied. This microscopic movement serves to dislodge hard scale attached to the plates. This movement or swaying motion is illustrated in FIG. 5. Exemplary plate 28 of FIG. 5 (not indicated as having back-to-front mirror-image construction) is shown swaying away from the vapor, as the vapor is at a higher temperature and pressure. While it is known to use gaskets G' in prior art PHEs as shown in FIG. 7, it has been found in accordance with the present invention that the arrangement of gaskets 66 so as to cause plates 28 not to contact each other as described herein and shown in FIG. 8 enables plates 28 to be "self-cleaned" as described above.

Figure 3B:
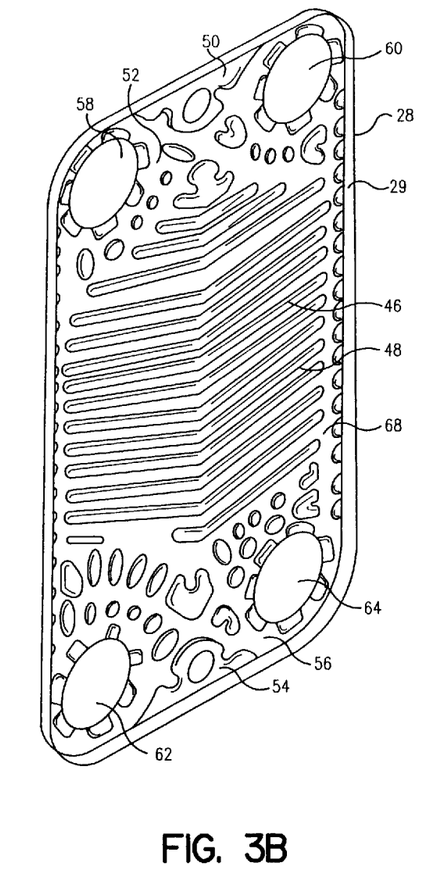
Figure 3C:
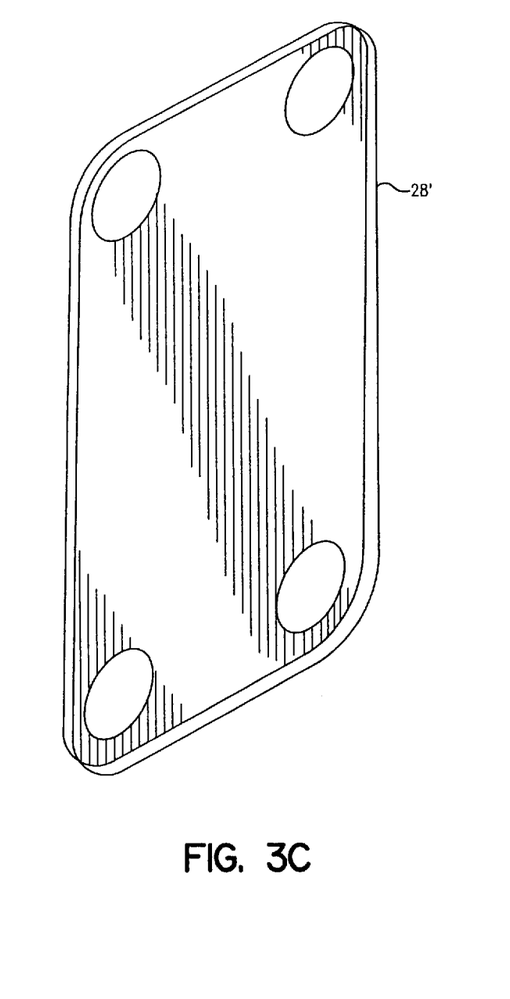
FIG. 3C illustrates a perspective view of an alternative embodiment of a plate for use in a heat exchanger according to the present invention.

FIG. 3C illustrates an alternative embodiment of plate 28. In FIG. 3C, plate 28' is shown to have smooth faces. According to the present invention, it has been found that smooth faces work better than do corrugated faces for distilling certain types of waste stream.

Figure 4:
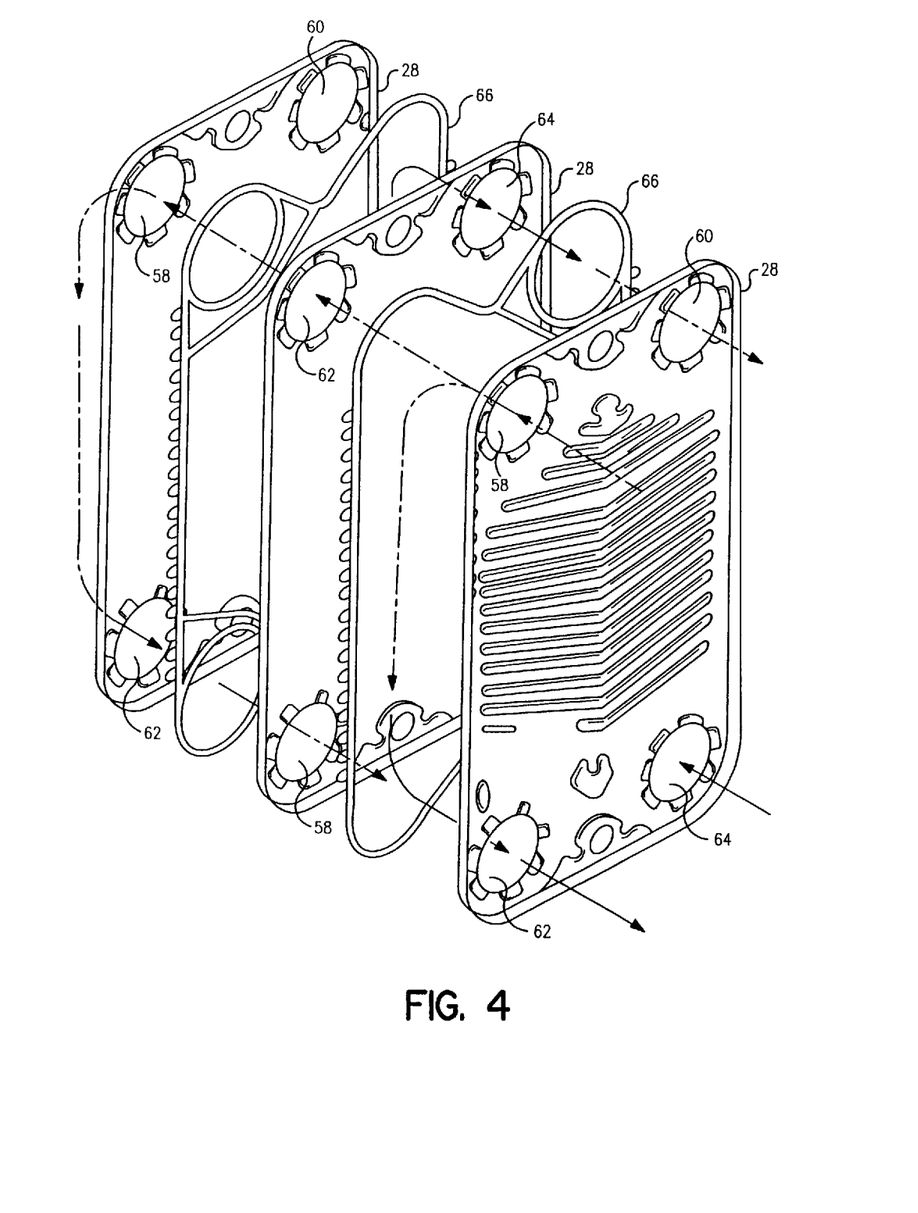
FIG. 4 illustrates an exploded perspective view of three plates and two gaskets arranged according to a preferred embodiment of the present invention.

As shown in FIG. 3B, gasket 66 is constructed such that it surrounds the entire perimeter of plate 28 but will only surround a pair of holes on one side (left/right) of a surface of plate 28. When a hole is completely surrounded, i.e., isolated, by gasket 66, liquid or vapor cannot flow thereout-of and into the space between the plates separated by that gasket 66. As shown in FIG. 4, the orientation of gasket 66 will be alternated to isolate and surround opposite pairs of holes on opposite surfaces of each plate 28. Therefore, the vapor and liquid can be passed along opposite surfaces of plate 28 as described above.

Gasket 66 will completely surround all four holes in the plates nearest end caps 30 and 32 to prevent leakage.

A void is provided between two parts of gasket 66 below hole 60. Any fluid that may leak into hole 60 collects in this void space and is discharged to the atmosphere from a side or top area of plate 28. This feature further prevents the intermingling of fluids.

FIG. 4 shows a preferred embodiment of the stackup of plates 28 and gaskets 66. Starting from either end, one of plates 28 is the same as shown in FIG. 3A. The next plate 28 is substantially the same as the plate shown in FIG. 3A only inverted top-to-bottom. Consequently, the chevron configuration is inverted with respect to the plate in FIG. 3A, and the grooves on the top and bottom sections of this plate run in the opposite directions as those in the plate in FIG. 3A. Thus, a fluid flowing between adjacent plates 28 must zigzag through grooves running diagonally in opposite directions and chevron configurations pointing both upwards and downwards. Turbulence, and thus heat transfer, is substantially increased by the numerous alterations in flow and the multitude of points at which the fluid will contact the plates. The non-inverted/inverted arrangement of adjacent plates continues throughout heat exchanger 12. Pressurized vapor and liquid flow downward and upward, respectively, through alternate channels between plates 28. Heat is transferred from the vapor to the liquid through the plates, thereby forming a heated liquid and a non-pressurized vapor from the liquid.

Plates 28 are preferably made from metal, and may be coated with Teflon™ to further discourage the settling of particles thereon. Alternatively, the plates may be made from a thermoplastic. This construction would be advantageous due to the low adhesiveness of scale to such a material. Generally, the plates may be made from any material.

Separator 16 provides the time, space, and conditions for gravity to separate a falling liquid from a rising vapor. A small volume of liquid covers the bottom of the separator. This small volume of liquid possesses a small amount of energy, thereby increasing energy efficiency, affording safer operating conditions, and making cleaning easier and less frequently needed. Conventional means are provided for maintaining the liquid level in separator 16. Normal operating pressure inside the separator is slightly positive.

Figure 6:
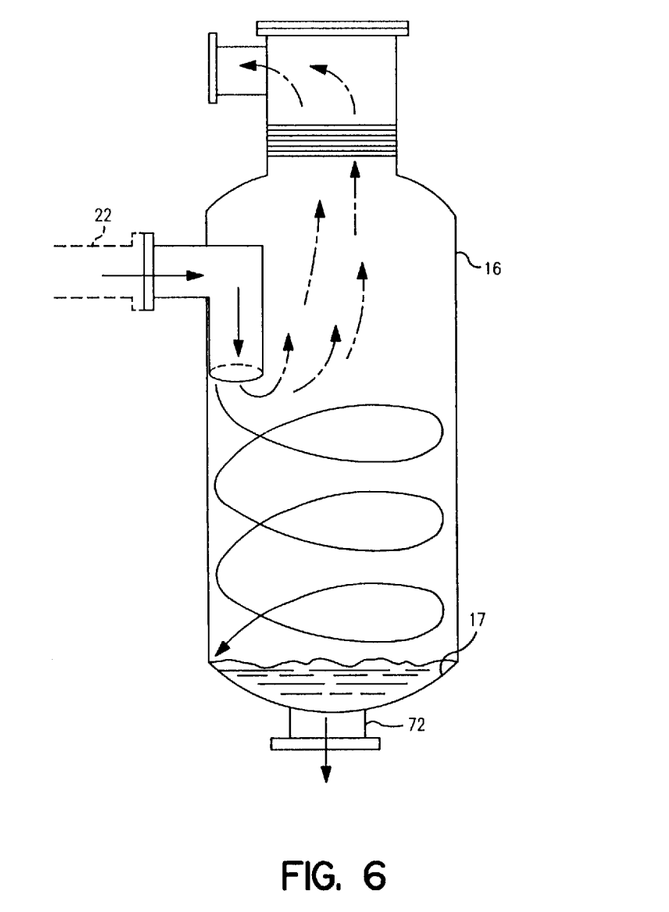
FIG. 6 illustrates the swirling motion created in a separator according to a preferred embodiment of the present invention.

As stated earlier, a combination of heated liquid and non-pressurized vapor are passed into separator 16 via passage 22. As shown in FIG. 6, passage 22 preferably extends into separator 16 at a downward angle. Consequently, liquid entering separator 16 follows the path shown in FIG. 6, and creates the hurricane-like swirl depicted. This swirl causes liquid exiting passage 22 and any liquid in the bottom of separator 16 to be swirled in a hurricane-like motion. The swirling motion sweeps solids, such as precipitates, or concentrate, toward the center of bottom section 17. An end of concentrate discharge line 72 communicates with a central portion of bottom section 17 to create a normally open recirculation loop having a strainer 74. Concentrate pump 75 in communication with concentrate discharge line 72 to pump concentrate and liquid through strainer 74. Periodically, however, by conventional controlling means, valve 77B will be opened for a short time and valve 77A will be closed for the identical time to allow liquid and concentrate to exit separator 16. Strainer 74 filters out large particles of concentrate but allows liquid to pass therethrough, through an optional concentrate stop valve 77, (not shown) and back into separator 16. The large particles of concentrate are discharged from the system and disposed of in a proper manner.

Between the periodic concentrate removals, some solid particles are pumped into heat exchanger 12 via passage 24. This is desired, as discussed earlier, for the solid particles help to chip away scale on the surfaces of heat exchanger 12 and plates 28.

Riser tube 76 also communicates with bottom section 17 and the atmosphere. Riser tube 76 stands several feet above the liquid level in separator 16. The pressure in separator 16 pushes liquid up riser tube 76. Excessive pressure in separator 16 will push liquid out of riser tube 76, thereby releasing pressure from the system.

Vapor rises up and out of separator 16 and through mist eliminator 78. Mist eliminator 78 prevents the passage of any entrained liquids to vapor compressor 14. The vapor then passes to vapor compressor 14 via passage 27. Vapor compressor 14 pressurizes, and thereby adds heat to, the vapor. An injection line 80 is provided between separator 16 and vapor compressor 14, and preferably proximate vapor compressor 14. Injection line 80 is used for injecting droplets of cooling water into vapor compressor 14 when the temperature therein becomes too high. A sensor can be attached to the outlet of vapor compressor 14 for monitoring this temperature. The injection of small amounts of liquid into vapor compressor 14 helps to seal the pump, thereby increasing its useful life and efficiency.

As stated earlier, distillate is passed out of heat exchanger 12 through first exit passage 20. The distillate is preferably passed through a liquid drainer 82 comprising a float 84 therein. Float 84 is a conventional float that allows liquid to pass but prevents the passage of vapor. The liquid distillate is then passed through distillate pump 86, bypassing optional injector valve 80, and to feed pre-heater 88. Feed pre-heater 88 is any type of conventional heat exchanger, and is used for transferring heat from the hot distillate to a colder feed liquid. This process makes use of the excess energy possessed by the distillate, and thus increases the efficiency of the process. After the distillate passes out of pre-heater 88, it can either be discharged from the system using distillate diverter valve 89 and distillate discharge valve 89' or passed back into de-gasser 94. De-gasser 94 will be discussed in further detail below.

Preferably, the feed liquid is passed from a feed stock 91, through selector valve 91', through a strainer valve 90', and to strainer 90. Strainer 90 traps solid particles that are present in the feed liquid. These particles are purged from the system and disposed of in a proper manner. From strainer 90, the feed liquid can be passed through fill valve 93 and pumped by circulating pump 92 to pre-heater 88, where it is heated up by the hot distillate. From pre-heater 88, the feed liquid is passed to de-gasser 94. De-gasser 94 provides space and time for the heated feed to separate into different types of liquids with differing specific gravities, such as oil and water. Often, feed stock will contain emulsifications of oil and water. Heat will break some of the emulsions and release the oil so that it will float on the water. A conventional oil skimming device, or any other suitable means, may be used to skim oil from the top of the water layer. Similar techniques may be used to remove other undesired liquids which may separate from water, or whatever the desired liquid may be, in de-gasser 94. De-gasser 94 is equipped with a conventional liquid level control device to maintain a working volume of hot liquid feed.

From de-gasser 94, the feed liquid can be passed in two directions. If it is desired to remove more undesired liquids from the desired liquid, the feed liquid may be passed back into pre-heater 88 for reheating and return to de-gasser 94 by opening valve 93. If the feed liquid has been separated to the desired level, it may be passed by separator fill pump into separator 16 via inlet passage 18 and back-flow preventer valve 97. Valve 94' can be a manual drain.

Thus, it is seen that an improved process and apparatus for vapor compression distillation can be provided. It is also seen that an improved process and apparatus for vapor compression distillation that is highly efficient, economical, and safe to operate can be provided. It is also seen that an improved process and apparatus for vapor compression distillation that is usable for a variety of processes can be provided. It is also seen that an improved process and apparatus for vapor compression distillation that keeps scale buildup to a minimum can be provided.

It is understood that many variations of the present invention will become apparent to one of ordinary skill in the art upon reading the specification. Such variations are within the spirit and scope of the present invention as defined by the following appended claims.

That which is claimed:

1. A vapor compression distillation apparatus comprising:
   a heat exchanger;
   a vapor compressor being in one-way fluid communication with said heat exchanger;
   a liquid-vapor separator being in two-way fluid communication with said heat exchanger and being in one-way fluid communication with said vapor compressor;
   an inlet passage for passing feed into said separator; and
   a first exit passage for passing distillate out of said heat exchanger;
   whereby a pressurized vapor from said vapor compressor and a liquid from said separator can be passed into said heat exchanger such that:
   said pressurized vapor at least partially condenses and forms a distillate, said distillate being passed out of said heat exchanger through said first exit passage;
   said pressurized vapor provides heat to said liquid resulting in the formation of a heated liquid and a non-pressurized vapor, wherein said non-pressurized vapor and said heated liquid can be passed into said separator where they are separated, wherein said non-pressurized vapor can be passed into said vapor compressor for passage back into said heat exchanger, and wherein said heated liquid can be passed back into said heat exchanger.

2. The apparatus according to claim 1 wherein said heat exchanger comprises a plurality of generally vertical plates.

3. The apparatus according to claim 2 wherein faces of adjacent plates are spaced apart for allowing said plates to microscopically move due to thermal and mechanical forces applied to said plates.

4. The apparatus according to claim 3 wherein each said plate further comprises a recessed face and a non-recessed face, and further comprising a gasket attached to said recessed face of each said plate, said gaskets protruding from said recessed faces such that, when said plate pack is compressed, said gaskets will be in contact with said recessed face of one plate and said non-recessed face of an adjacent plate.

5. The apparatus according to claim 2 wherein each of said plates has a middle section comprising a plurality of grooves therein, said plurality of grooves being generally arranged in a chevron configuration, said plates being arranged such that said chevron configurations of adjacent plates point in opposite directions.

6. The apparatus according to claim 2 wherein said plates have generally smooth faces.

7. The apparatus according to claim 2 wherein said plates are made from metal and are coated with Teflon™.

8. The apparatus according to claim 2 wherein said plates are made from a thermoplastic.

9. The apparatus according to claim 1 wherein said two-way communication between said separator and said heat exchanger further comprises a second exit passage communicating with an upper area of said heat exchanger and a middle area of said separator for passing said heated liquid and said non-pressurized vapor into said separator, said second exit passage extending into said middle area of said separator at a downward angle for creating a hurricane-like swirl of liquid in a lower area of said separator, and wherein said separator further comprises a bottom section which is generally shaped as an inverted dome, said hurricane-like swirl sweeping solids toward a center of said bottom section.

10. The apparatus according to claim 9 wherein liquid is maintained at a predetermined level in said separator, said predetermined liquid level being below an outlet of said second exit passage, said hurricane-like swirl for swirling liquid exiting said second exit passage and for swirling liquid in said lower area of said separator.

11. The apparatus according to claim 9 further comprising a concentrate discharge line communicating with said bottom section of said separator for removing concentrate from said separator.

12. The apparatus according to claim 1 wherein said non-pressurized vapor is formed in an upper portion of said heat exchanger.

13. The apparatus according to claim 1 wherein said pressurized vapor enters said vapor compressor at approximately 290° F., and wherein said liquid enters said heat exchanger at approximately 212° F.

14. The apparatus according to claim 1 further comprising a feed pre-heater communicating with said separator and with said heat exchanger, said distillate being passed to said pre-heater through said first exit passage, said distillate providing heat to said feed liquid in said pre-heater, said heated feed liquid being passed from said pre-heater to said separator.

15. The apparatus according to claim 14 further comprising a de-gasser communicating with said pre-heater, said de-gasser for separating desired and undesired types of liquids, any said undesired liquids being removed from said de-gasser and said desired feed liquid being passed from said de-gasser to said separator.

16. A vapor compression distillation process comprising the steps of:

providing a heat exchanger, a liquid-vapor separator, and a vapor compressor;

passing a pressurized vapor into said heat exchanger;

passing a liquid into said heat exchanger;

allowing said pressurized vapor to at least partially condense and form a distillate;

passing said distillate out of said heat exchanger;

heating said liquid with heat given off by said pressurized vapor;

forming a heated liquid and a non-pressurized vapor from said liquid;

passing said heated liquid and said non-pressurized vapor into said separator;

separating said heated liquid and said non-pressurized vapor in said separator;

passing said heated liquid into said heat exchanger;

passing said non-pressurized vapor into said vapor compressor;

pressurizing said non-pressurized vapor to form more pressurized vapor; and passing said more pressurized vapor into said heat exchanger.

17. The process according to claim 16 wherein said step of providing a heat exchanger further comprises providing a heat exchanger comprising a plurality of generally vertical plates, and further comprising the steps of passing said pressurized vapor generally downward through alternate channels between said adjacent plates and passing said liquid generally upward through alternate channels between said adjacent plates such that said pressurized vapor and said liquid generally do not come into direct contact.

18. The process according to claim 16 wherein said step of forming a heated liquid and a non-pressurized vapor from said liquid further comprises forming a heated liquid and a non-pressurized vapor from said liquid in an upper portion of said heat exchanger.

19. The process according to claim 16 further comprising the step of passing solids into said heat exchanger.

20. The process according to claim 16 wherein said step of passing said heated liquid and said non-pressurized vapor into a liquid-vapor separator further comprises passing said heated liquid and said non-pressurized vapor into a liquid-vapor separator at a downward angle, and further comprising the step of swirling liquid in said separator in a hurricane-like motion for sweeping solids to a bottom center of said separator.

21. The process according to claim 20 further comprising the step of periodically passing said solids out of said separator.

22. The process according to claim 16 further comprising the steps of passing a feed liquid into a feed pre-heater, passing said distillate into said pre-heater, allowing said distillate to give off heat in said pre-heater, heating said feed liquid with said heat given off by said distillate.

* * * * *